Sept. 22, 1964  E. E. PRATHER  3,149,539
VALVE CONSTRUCTION
Filed Oct. 22, 1959  3 Sheets-Sheet 1

INVENTOR.
EDWIN E. PRATHER.
BY
William P. Hickey
ATTORNEY.

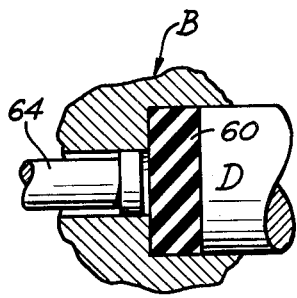
LAP POSITION.
FIG_2
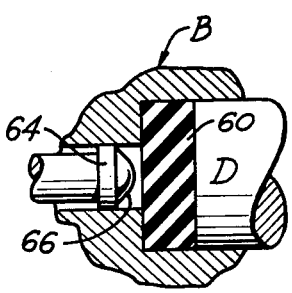
LAP POSITION.
FIG_3
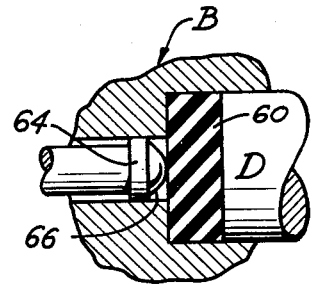
LAP POSITION.
FIG_4
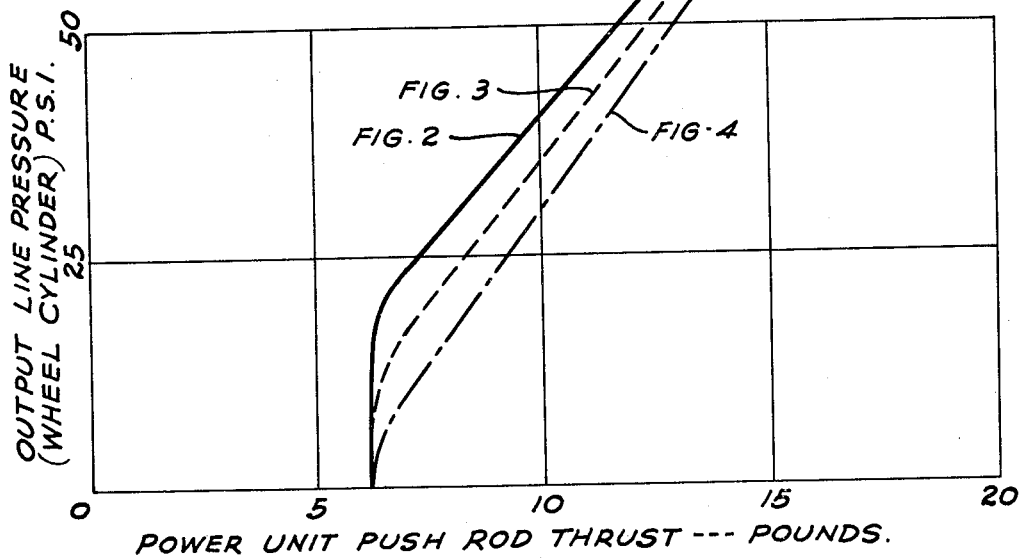
FIG_5
INVENTOR.
EDWIN E. PRATHER.
BY
ATTORNEY.

Sept. 22, 1964  E. E. PRATHER  3,149,539
VALVE CONSTRUCTION
Filed Oct. 22, 1959  3 Sheets-Sheet 3
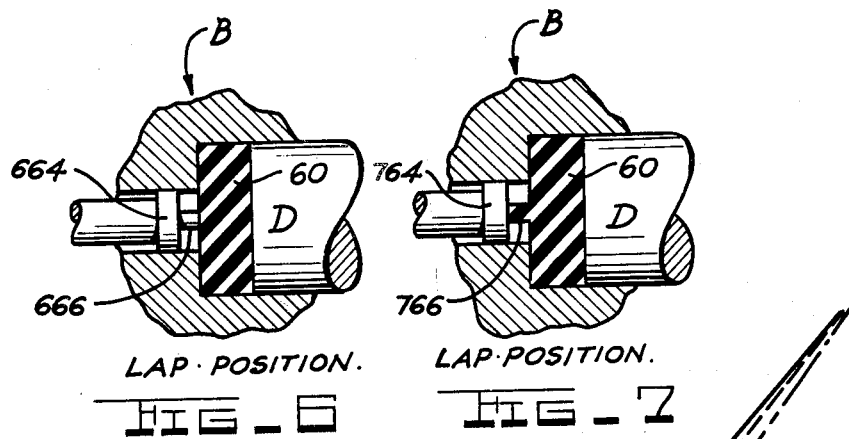
LAP·POSITION.  LAP·POSITION.
FIG_6  FIG_7
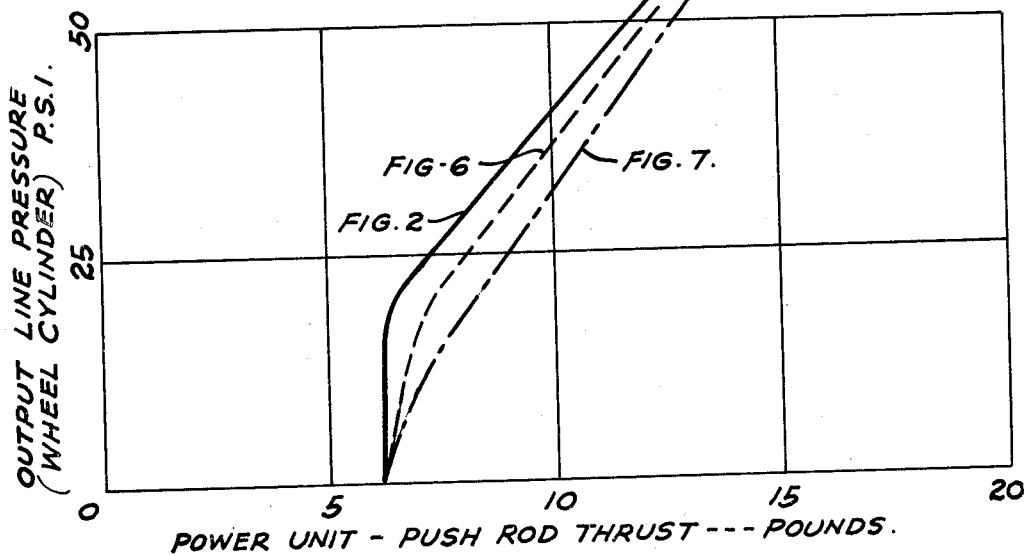
FIG_8
INVENTOR.
EDWIN E. PRATHER.
BY
William P Hickey
ATTORNEY

United States Patent Office 3,149,539
Patented Sept. 22, 1964

3,149,539
VALVE CONSTRUCTION
Edwin E. Prather, South Bend, Ind., assignor to The Bendix Corporation, a corporation of Delaware
Filed Oct. 22, 1959, Ser. No. 847,955
10 Claims. (Cl. 91—369)

The present invention relates to reaction producing mechanism; and more particularly to a servomotor construction of the type incorporating reaction producing mechanism which applies an opposing force to actuating movement of its control mechanism.

An object of the present invention is the provision of a new and improved type of reaction producing structure which can be used to indicate the force being transmitted from a driving member to a driven member and which will gradually and smoothly come into operation to transmit its reactive force during initial actuation of the driven member by the driving member.

In one form of fluid pressure operated servomotor mechanism that has been used heretofore to power actuate the brakes of automotive vehicles, a diaphragm that was subjected to the actuating differential air pressure was used to provide a reactive force which opposed actuating movement of its control valve structure. It was a property of such mechanisms that the initial actuation of its valving structure would permit a quick passage of air which, when it reached the diaphragm, would give a sharp reactive force to the control valve structure. In another type of servomotor structure which has been used to power actuate the brakes of automotive vehicles, a block of rubber was incorpoated between the driving and driven structures which, when the servomotor was actuated, would squeeze the rubber sufficiently to force it against a reaction plunger that opopsed the actuating movement of the servomotor's control structure. It was a property of this type of reaction producing structure that a considerable amount of force would have to be delivered upon the driven structure before sufficient movement of the rubber occurred to take up the clearance in its reaction transmitting structure and thereafter apply reactive force upon the control structure of the servomotor. It has therefore been the property in these and still other types of reaction producing mechanisms with which applicant is familiar, that an initial sharp rise in the force delivered by the servomotor occurred before the time that the initial reaction was transmitted back upon the servomotor's control structure. It has heretofore been found necessary to provide clearance in the reaction structure in the latter described type of reaction mechanism so that the reaction structure would not be forced into the block of rubber when the control mechanism was actuated to the point where it started movement of the driving mechanism, and so that this deformation of the rubber would not produce an uncomfortably high force requirement to bring the servomotor into actuation.

Another object of the present invention is the provision of a new and improved reaction structure of the above described type which does not produce a rapid build-up in reactive force upon the control structure of the servomotor.

A further object of the present invention is the provision of a new and improved servomotor control structure of the above described type in which there can be a slight interference between the rubber and the reaction transmitting structure during the initial actuating movement of the control mechanism of the servomotor.

A more detailed object of the present invention is the provision of new and improved reaction structure of the above described type in which a projection is incorporated between the block of rubber and reaction transmitting structure which transmits a small initial force between the block of rubber and the reaction transmitting structure when reaction is first produced by the mechanism.

A still more detailed object of the present invention is the provision of new and improved control structure incorporating the reaction transmitting mechanism of the above described type in which there is interference of the projection and the block of rubber prior to the time that the servomotor's control structure starts actuation of its driving member.

The invention resides in certain constructions, and combinations, and arrangements of parts; and further objects and advantages will become apparent to those skilled in the art to which the invention relates from the following description of the preferred embodiments described with reference to the accompanying drawings forming a part of this specification, and in which:

FIGURE 2 is a fragmentary cross sectional view of a type of reaction producing mechanism used heretofore;

FIGURE 3 is a fragmentary cross sectional view similar to FIGURE 2 but showing one embodiment of the present invention;

FIGURE 4 is a fragmentary cross sectional view similar to FIGURE 2 but showing another arrangement of the structure shown in FIGURE 2;

FIGURE 5 is a graph showing the delivered force versus the reaction force that is transmitted by the structure shown in FIGURES 2 and 3 of the drawings;

FIGURE 6 is a fragmentary cross sectional view similar to that shown in FIGURE 3 but showing still another embodiment of the present invention;

FIGURE 7 is a fragmentary cross sectional view quite similar to that shown in FIGURE 6 but showing still another embodiment of the present invention;

FIGURE 8 is a graph of the delivered force versus the reaction force that is transmitted for each of the structures shown in FIGURES 6 and 7 of the drawings.

Figure 1:
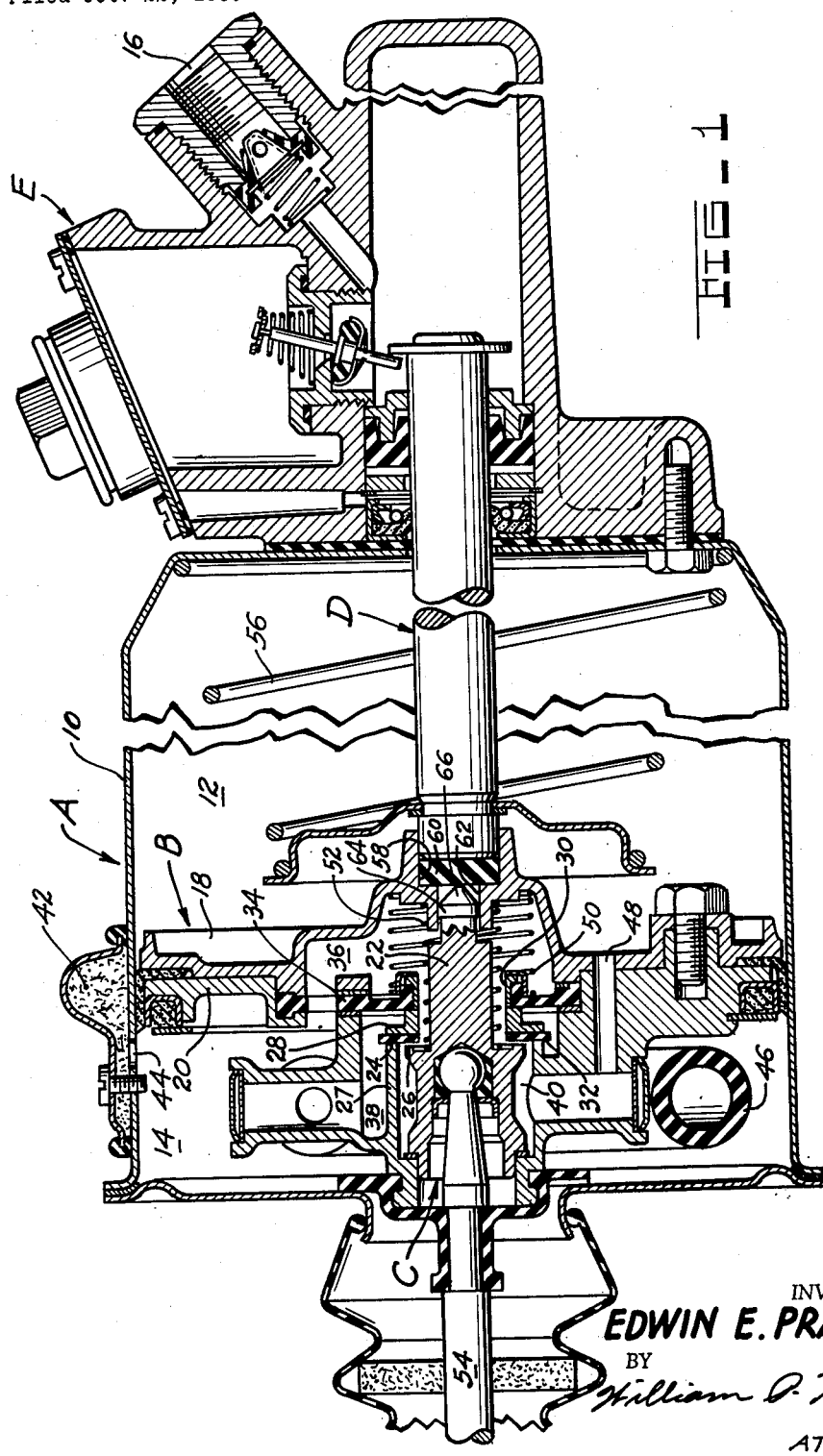
FIGURE 1 is a cross sectional view of a fluid pressure servomotor driven hydraulic pressure producing mechanism of the type used to actuate the hydraulic brakes of automotive vehicles.

While the invention may be otherwise embodied, it is herein shown and described as embodied in the control structure of the type of fluid pressure servomotor that is used to power actuate the hydraulic brakes of automotive vehicles.

The power actuated fluid pressure generating device shown in the drawing generally comprises a servomotor A whose stamped cup-shaped sheet metal housing 10 provides an internal chamber therein that is divided into opposing front (right hand side, as seen in the drawing) and rear power chambers 12 and 14 respectively by a movable wall of piston B. Differential pressure across the movable wall B is controlled by a suitable control valve structure C mounted in and carried by the movable wall B—and which control structure when actuated causes the movable wall B to force a displacement plunger D into a hydraulic master cylinder E that is attached to the front end of the servomotor A and thereby displace fluid under pressure through an outlet connection 16 which is normally connected to a hydraulic braking system, not shown, of an automotive vehicle.

The servomotor A shown in the drawings is of the atmospheric submerged type in which atmospheric pressure is communicated to both opposing power chambers 12 and 14 during the deenergized condition of the servomotor; and the servomotor is actuated by introducing vacuum from the vehicle's propelling engine into the front power chamber 12 of the servomotor. The structure shown is generally of the same type shown and described in the Earl R. Price application No. 699,384 filed November 27, 1957; and for a detailed understanding of its construction and operation reference may be had to that application. In order that the present invention can be understood without reference to that application, a short description will now be given of the structure seen in FIGURE 1.

The movable wall B is formed by means of front and rear die cast sections 18 and 20 respectively having various cavities and passages therein which, when the sections 18 and 20 are bolted together, form the various chambers and passages of the control valve structure C. An axially extending movable control member 22 is positioned in the central cavities of the movable wall sections; and a pair of generally concentric and forwardly facing valve seats 24 and 26 are formed by a partition wall 27 in the rear piston section 20, and a flange on the control member 22, respectively. A generally spool shaped annular poppet structure 28 having a large central opening 30 therethrough through which the front reduced diameter section of the control member 22 extends is positioned forwardly of valve seats 24 and 26 for the purpose of closing off the ports formed by the respective valve seats. The rear flange 32 of the poppet member 28 is suitably coated with rubber for sealing abutment with the respective valve seats 24 and 26; and the front flange 34 is formed by means of a rubber diaphragm— the radially outer peripheral edges of which are suitably clamped between the front and rear sections 18 and 20 of the movable wall B. The area forwardly of the diaphragm 34 and which extends around to include the central opening 30 of the poppet member 28 forms the atmospheric chamber 36 of the valve; the area rearwardly of the diaphragm 34 and which is radially outward of the partition 27 forms the vacuum chamber 38 of the valve; and the annular area between the vacuum valve seat partition 27 and the movable control member 22 forms the control chamber 40 of the valve. Atmospheric pressure is continually communicated to the rear power chamber 14 through the air filter 42 and opening 44, and thence flows through a suitable opening in the movable wall to the atmospheric chamber 36; vacuum from the vehicle's propelling engine is continually communicated to the vacuum chamber 38 through a flexible rubber tube 46; and the control chamber 40 of the valve continually communicates with the front power chamber 12 through a control passage 48 that is formed in the movable wall B. The spool shaped poppet member 28 is normally held in engagement with the vacuum valve seat 24 by a coil spring 50; and the atmospheric valve seat 26 is normaly held out of engagement with the spool shaped poppet member 28 by means of a valve return spring 52 interpositioned between the control member 22 and the front section 18 of the movable wall B. In the normal condition, therefore, of the control valve structure C, the atmospheric valve seat 26 is out of engagement with the poppet member 28 so that atmospheric pressure flows from the rear power chamber 14 through the atmospheric valve chamber 38 and into the control chamber 40 to thereby establish atmospheric pressure in both power chambers 12 and 14 of the servomotor. When it is desired to actuate the servomotor, the control member 22 is moved forwardly by means of the push rod 54 to cause the atmospheric valve seat 26 to engage the poppet member 28 to seal off further communication of the atmosphere with the front power chamber 12; and thereafter further forward movement of the control member 22 causes the poppet member 28 to be moved forwardly out of engagement with the vacuum valve seat 24 to permit air from the front power chamber 12 to flow into the vacuum valve chamber 38 and thence to the intake manifold of the vehicle's propelling engine.

Differential pressure across the movable wall B causes the movable wall to overcome the force of the movable wall return spring 56 and thereafter pushes the displacement plunger B into the hydraulic master cylinder E to actuate the hydraulic brakes of the vehicle. The rearward end of the displacement member D is received in a suitable cup shaped reaction chamber 58 in the forward surface of the movable wall B, and a rubber reaction disc 60 is interpositioned between the bottom of the cup shaped reaction chamber 58 and the rearward end of the displacement member D so that it is pressurized whenever force is transmitted from the movable wall to the displacement member. In order that reaction force indicative of the force being transmitted from the movable wall B to the displacement member D will be provided against actuating movement of the control member 22, and in order that a proportional output force will be exerted upon the displacement member D for any actuating force which is applied to the control member 22, a small diameter chamber or opening 62 is provided in the front piston section 18 of the movable wall which opening 62 communicates with the rearward face of the rubber reaction disc 60. A small projection 64 on the forward end of the control member 22 extends into the small diameter opening 62 to the region adjacent the rubber reaction disc 60, so that deformation pressure of the rubber reaction disc will be exerted upon the projection 64 to oppose the actuating movement of the control member 22. For a more complete understanding of the construction and operation of the structure so far described, reference may be had to the above mentioned Earl R. Price application No. 699,384.

As previously indicated, it is an object of the present invention to provide a servomotor, and/or a mechanism for transmitting reaction to the control element of the servomotor which will produce a reaction force which is generally indicative i.e. generally proportional, to the force being developed by the servomotor once the servo has been brought into actuation; and which will, during the start up or initial actuation of the servomotor, provide a reaction which, while it will not be proportional to the delivered force and may therefore be somewhat distorted, will be a smooth build-up in the reactive force upon the control element of the servomotor.

According to principles of the present invention, the above stated objects are accomplished by means of the use of a generally resiliently deformable block of rubber-like material 60 that is positioned in the cup shaped reaction chamber 58 between the driving member B and the driven member D. It is important to the accomplishment of the above stated objects that the block of rubber-like material 60 be compounded in such manner that it is resiliently deformable, and so that it will resiliently resume its original shape regardless of the number of times and the amount of deformation pressure that is placed upon it. The reaction producing structure of the present invention is further completed by a small diameter projection, either on the disc 60, or on the reaction transmitting member 64—and which in the embodiment shown in FIGURE 1, is a projection of the control member 22 of the servomotor. In order that the above stated objects will be accomplished satisfactorily, the main portion of the reaction transmitting member 64 should substantially close off its receiving chamber 62 so that the reaction disc 60 will not be extruded past it; and the small diameter projection 66 should preferably be centered in the chamber 62 and be of a cross section which is preferably only a fraction of the chamber 62.

In the invention described in application No. 699,384, it was not necessary that the reaction disc 60 be compounded so that it remained resiliently deformable throughout its service life; but in that invention it was essential only that the reaction disc be a normally semirigid pressure deformable body which could be picked up by the fingers of an assembler and then placed in position, as for example silicone putty, and various semi cured forms of natural and synthetic rubbers. Also in the prior art development, the reaction transmitting member 64 was provided with a flat face for engagement with the reaction disc 60; and a generally predetermined amount of clearance between this face and the rubber disc 60 was provided in the lapped condition of the servomotor's valve structure. One reason necessitating this clearance was that the tolerance which is required in mass produced parts provide a "stack up" which, if the valve were designed to have the front face of the reaction transmitting member 64 abut the reaction disc 60 in its lapped position, would in a sizable percentage of the units manufactured, extend into the reaction disc 60 by such an amount requiring an uncomfortably large actuating force to be exerted upon the control member 22 in order to bring the servomotor into operation. Another reason for the clearance that was provided, was so that the reaction transmitting structure would produce a "graduation curve" which would correspond to the graduation curve of the prior art reaction transmitting mechanism which had previously been manufactured.

FIGURE 2 is a fragmentary view of the type of reaction producing structure shown in application No. 699,384; and curve 2 in FIGURE 5 shows the type of stepped graduation curve which it and the prior art reaction producing structures generally have produced.

In the type of reaction producing structure shown in FIGURES 1, 3 and 4 of the drawings, the end face of the reaction transmitting member 64 is provided with a generally conically shaped projecting surface 66, the apex of which forms the initial force transmitting contact between the resiliently deformable reaction disc 60 and the reaction transmitting member 64. In the embodiment shown in FIGURES 1 and 4 of the drawings the apex of the cone is designed to contact the reaction disc 60 in the lapped condition of the control valve; and because of "stack up" of tolerances may in some instance have a noninterference, or an interference fit with respect thereto. Inasmuch as only a small area of the reaction disc 60 is initially contacted, the amount of interference fit that is provided in mass production manufacturing methods does not appreciably effect the "feel" in the units which are produced, and the reaction curve for these units will give a graduation curve corresponding to curve 4 shown in FIGURE 5. As seen in FIGURE 1, a valve return spring 52 is used to normally hold the control member 22 out of its lapped position; and according to further principles of the present invention, this spring can be eliminated by providing a sufficient interference fit between the end of the conical projection 66 and the reaction disc 60. In those instances where it is desired to have a stepped type of graduation curve, and at the same time have a gradual transition from the no reaction portion to the proportional sections of the graduation curve, i.e., as shown in curve 3 of FIGURE 5, a predetermined amount of clearance may be provided between the apex of the cone and the reatcion disc 60 in the lapped condition of the valve.

Still other embodiments of the present invention are shown in FIGURES 6 and 7 of the drawing. Those portions of FIGURES 6 and 7 which correspond to similar portions in FIGURE 1 are designated by like reference numerals characterized further in that the corresponding figure number precedes the two digit part number shown in FIGURE 1. In the embodiment shown in FIGURE 6, a generally cylindrical projection 666 is made integral with the reaction transmitting member 664. In the embodiment of the reaction producing structure shown in FIGURE 7, the generally cylindrically shaped projection 766 is formed integrally with and of the resiliently deformable material 60, and the end face reaction transmitting member 764 is shown as a generally flat surface. As in the previous embodiment, the end surface of the cylindrical projection 766 is shown as engaging the end surface of the reaction member 764 in the lapped position of the servomotor's control valve. Curves 6 and 7 shown in FIGURE 8 show the type of graduation curve which is provided by each of the respective structures.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In reaction producing means for mechanism having a driven and a driving member: a collapsible chamber enclosure operatively interpositioned between said members so that its collapsible chamber is reduced in volume when said driving member actuates said driven member, a semi-rigid body element of resiliently deformable material confined in said collapsible chamber, said enclosure including a second chamber of predetermined cross section in the sidewalls of said enclosure which second chamber opens into said collapsible chamber, a reaction element in said second chamber adjacent said semi-rigid body element for operative abutment with said semi-rigid body element, said reaction element substantially closing off said second chamber, and a projection interposed between said elements and having an end of lesser cross sectional area than said second chamber for engagement with one of said elements for making the initial force transmission between said elements when said driving member actuates the driven member.

2. In reaction producing means for mechanism having a driven member and a driving member: a collapsible chamber enclosure operatively interpositioned between said members so that its collapsible chamber is reduced in volume when said driving member actuates said driven member, a semi-rigid body element of resiliently deformable material confined in said collapsible chamber, said enclosure including a second chamber of predetermined cross section in the sidewalls of said enclosure which second chamber opens into said collapsible chamber, and said resiliently deformable material having a projection projecting into said second chamber, said projection having an area of initial contact less than the opening of said second chamber into said collapsible chamber of said second chamber, and a reaction element in said second chamber adjacent said projection for operative abutment with said semi-rigid body element, whereby initial reactive force is transmitted through said projection until such time as it is deformed sufficiently to bring the main body portion of said deformable element into engagement with said reaction element.

3. In reaction producing means for mechanism having a driven member and a driving member: a collapsible chamber enclosure operatively interpositioned between said members so that its collapsible chamber is reduced in volume when said driving member actuates said driven member, a semi-rigid body element of resiliently deformable material confined in said collapsible chamber, said enclosure including a second chamber of predetermined cross section in the sidewalls of said enclosure which second chamber opens into said collapsible chamber, a reaction element in said second chamber adjacent said semi-rigid body element for operative abutment with said semi-rigid body element, said reaction element substantially closing off said second chamber, and said reaction element having a projection generally centered with respect to said second chamber and having a cross section considerably smaller than said second chamber for making the initial force transmission between said elements when said driving member actuates the driven member.

4. In reaction producing means for mechanism having a driven member and a driving member: a collapsible chamber enclosure operatively interpositioned between said members so that its collapsible chamber is reduced in volume when said driving member actuates said driven member, a semi-rigid body element of resiliently deformable material confined in said collapsible chamber, said enclosure including a second chamber of predetermined cross section in the sidewalls of said enclosure which second chamber opens into said collapsible chamber, a reaction element in said second chamber adjacent said semi-rigid body element for operative abutment with said semi-rigid body element, said reaction element substantially closing off said second chamber, and having a generally conically shaped face substantially centered with respect to said second chamber, the nose of which makes the initial force transmission between said elements when said driving member actuates the driven member.

5. In a servomotor and the like: a driven member; a driving member; a collapsible chamber enclosure operatively interposed between said members so that its collapsible chamber is reduced in volume when said driving member actuates said driven member; a semi-rigid body element of resiliently deformable material confined in said collapsible chamber and through which force is applied from said driving member to said driven member; control means for said driving member including a control member which when in an actuating position causes said driving member to increase the force applied to said semi-rigid body, a lapped position wherein it causes said driving member to hold the force being applied to said semi-rigid body, and a released position wherein it causes said driving member to release the force applied to said semi-rigid body; said enclosure including a second chamber of predetermined cross section in the sidewalls of said enclosure which second chamber opens into said collapsible chamber; and a reaction element in said second chamber adjacent said semi-rigid body element and operatively connected to said control member for transmitting force from said semi-rigid body to said control member in a direction moving it from its actuating position to its released position, and a projection generally centered with respect to said second chamber and having a normal cross section considerably smaller than said second chamber, said projection biasing said reaction element and said semi-rigid body element apart during movement of said control member from its released to its lapped position and before complete engagement between said elements.

6. In a servomotor and the like: a driven member; a driving member; a collapsible chamber enclosure operatively interpositioned between said members so that its collapsible chamber is reduced in volume when said driving member actuates said driven member; a semi-rigid body element of resiliently deformable material confined in said collapsible chamber and through which force is applied from said driving member to said driven member; control means for said driving member including a control member which when in an actuating position causes said driving member to increase the force applied to said semi-rigid body, a lapped position wherein it causes said driving member to hold the force being applied to said semi-rigid body, and a released position wherein it causes said driving member to release the force applied to said semi-rigid body; said enclosure including a second chamber of predetermined cross section in the sidewalls of said enclosure which second chamber opens into said collapsible chamber; and a reaction element in said chamber adjacent said semi-rigid body element and operatively connected to said control member for transmitting force from said semi-rigid body to said control member in a direction moving it from its actuating position to its released position, said semi-rigid body element having a projection generally centered with respect to said second chamber, and having a normal cross section considerably smaller than said second chamber, said projection biasing said reaction element and said semi-rigid body element apart during movement of said control member from its released to its lapped position and before complete engagement between said elements.

7. In a servomotor and the like: a driven member; a driving member; a collapsible chamber enclosure operatively interpositioned between said members so that its collapsible chamber is reduced in volume when said driving member actuates said driven member; a semi-rigid body element of resiliently deformable material confined in said collapsible chamber and through which force is applied from said driving member to said driven member; control means for said driving member including a control member which when in an actuating position causes said driving member to increase the force applied to said semi-rigid body, a lapped position wherein it causes said driving member to hold the force being applied to said semi-rigid body, and a released position wherein it causes said driving member to release the force applied to said semi-rigid body; said enclosure including a second chamber of predetermined cross section in the sidewalls of said enclosure which second chamber opens into said collapsible chamber; and a reaction element in said second chamber adjacent said semi-rigid body element and operatively connected to said control member for transmitting force from said semi-rigid body to said control member in a direction moving it from its actuating position to its released position, said reaction element having a projection generally centered with respect to said second chamber, and having a normal cross section considerably smaller than said second chamber, said projection biasing said reaction element and said semi-rigid body element apart during movement of said control member from its released to its lapped position and before complete engagement between said elements.

8. In a servomotor and the like: a driven member; a driving member; a collapsible chamber enclosure operatively interpositioned between said members so that its collapsible chamber is reduced in volume when said driving member actuates said driven member; a semi-rigid body element of resiliently deformable material confined in said collapsible chamber and through which force is applied from said driving member to said driven member; control means for said driving member including a control member which when in an actuating position causes said driving member to increase the force applied to said semi-rigid body, a lapped position wherein it causes said driving member to hold the force being applied to said semi-rigid body, and a released position wherein it causes said driving member to release the force applied to said semi-rigid body; said enclosure including a second chamber of predetermined cross section in the sidewalls of said enclosure which second chamber opens into said collapsible chamber; and a reaction element in said second chamber adjacent said semi-rigid body element and operatively connected to said control member for transmitting force from said semi-rigid body to said control member in a direction moving it from its actuating position to its released position, said reaction element having a generally dove shaped projection generally centered with respect to said second chamber, said projection biasing said reaction element and said semi-rigid body element apart when said control member is in its lapped position.

9. In reaction producing structure of a control valve: a body member having a stepped generally cylindrical chamber with large and small diameter portions separated by a shoulder, a body of elastomeric material having an end surface positioned against said shoulder, a control element positioned in said small diameter portion of said chamber having an end surface for abutment with said body of elastomeric material, control valve means operated by said control element, said control valve means being arranged to place increasing force on the side of said elastomeric body opposite said control element as said control element is moved toward said elastomeric body to force said elastomeric body against said control element, and said end surfaces of said elastomeric material and control element being shaped so that they abut each other on only a small area when small force is applied between said elastomeric body and control element and to abut each other in an increasing area as increasing force is applied between said elastomeric body and control element.

10. In reaction producing structure: a body member having a chamber therein one sidewall of which has a small diameter opening therein communicating with said chamber, a body of elastomeric material having an abutment surface positioned in said chamber opposite said opening, a control element reciprocably positioned in said opening and having an abutment surface for engagement with said abutment surface of said elastomeric material, control means operated by said control element, said control means being arranged to pressurize said elastomeric material with increasing force as said control element is moved towards said elastomeric material, and said abutment surfaces of said elastomeric material and control element being shaped so that they abut each other on only a small area when a small force is applied between said elastomeric body and said control element, and to abut each other on an increasing area as increasing force is applied between said elastomeric body and control element.

No references cited.

UNITED STATES PATENT OFFICE
CERTIFICATE OF CORRECTION

September 22, 1964

Patent No. 3,149,539

Edwin E. Prather

It is hereby certified that error appears in the above numbered patent requiring correction and that the said Letters Patent should read as corrected below.

Column 1, line 35, for "opopsed" read -- opposed --; column 2, line 52, for "of" read -- or --.

Signed and sealed this 9th day of March 1965.

(SEAL)
Attest:

ERNEST W. SWIDER
Attesting Officer

EDWARD J. BRENNER
Commissioner of Patents